United States Patent [19]

Bruns

[11] Patent Number: 4,834,598
[45] Date of Patent: May 30, 1989

[54] COMBINE HEAD CARRIER FOR TRANSPORT VEHICLE

[76] Inventor: Wesley W. Bruns, Rte. 2, Box 33, Gibbon, Minn. 55335

[21] Appl. No.: 64,689

[22] Filed: Jun. 22, 1987

[51] Int. Cl.$^4$ ................................................ B60P 3/00
[52] U.S. Cl. ........................................ 410/2; 410/156
[58] Field of Search .................... 410/2, 4, 44, 156; 248/172

[56] References Cited

U.S. PATENT DOCUMENTS

| | | | |
|---|---|---|---|
| 2,681,233 | 6/1954 | Smith | 410/2 X |
| 2,741,376 | 4/1956 | Hinds | 410/44 X |
| 3,154,207 | 10/1964 | Long | 410/44 X |
| 3,361,401 | 1/1968 | Hanifan | 410/156 |
| 3,655,218 | 4/1972 | Taylor | 410/44 X |
| 4,607,996 | 8/1986 | Koch | 410/4 X |
| 4,770,577 | 9/1988 | Farris | 410/2 |

Primary Examiner—Gerald A. Michalsky
Attorney, Agent, or Firm—Burd, Bartz & Gutenkauf

[57] ABSTRACT

A carrier mounted on a wagon running gear supports a combine head for transport to a desired location. The carrier has a pair of support assemblies attached to the wagon bolsters and a longitudinal support member. Each support assembly has a back stop and arm adjustably mounted on a beam. The support member is attached to each arm. The combine head rests on the support member and back stops.

27 Claims, 3 Drawing Sheets

COMBINE HEAD CARRIER FOR TRANSPORT VEHICLE

FIELD OF INVENTION

The invention relates to a product carrier for a transport vehicle. The carrier is used with a wagon to transport a combine head.

BACKGROUND OF INVENTION

Self-propelled combines are used to harvest crops such as corn, beans, and small grains. The combines are equipped with large heads, that pick up and collect the crops for delivery to the separating unit of the combine. The heads have substantial width to accommodate a plurality of rows of crops. The wide heads must be removed from the combine vehicle to permit the combine to be transported from field to field and on roads. The head is releasably mounted on the combine vehicle so that it can be quickly moved with a vehicle to a new location. The combine head carrier of the invention facilitates the removal of the head from the combine vehicle and the transport of the head to a new location.

SUMMARY OF INVENTION

The invention relates to an apparatus for supporting an object, product, machinery, and like structures on a support so that the object can be readily moved to a new location. The object is mounted on and removable from the apparatus without the use of special tools and with a minimum amount of time and labor. The apparatus has support assemblies that locate and hold the object in a selected location. The support assemblies are adjustable to accommodate different size and types of objects making the apparatus econonical and versatile in use. Each support assembly has a beam that holds a back stop and an arm. A support member secured to the arm cooperates with the back stop to provide support structure for the object. The back stop and arm are adjustably secured to the beam to allow for differences in the objects and machinery to be held by the apparatus.

In one mode of the apparatus of the invention, the apparatus is used to mount a combine head on a transport vehicle, such as a wagon having transverse front and rear bolsters. The apparatus has a first support assembly mounted on the front bolster and extended along the length thereof. A second support assembly is mounted on the rear bolster and extends generally parallel to the first support assembly. A longitudinal support member extends between and is secured to the first and second support assemblies. Each of the support assemblies has a back stop that is laterally spaced from the support member. The support member and the back stops cooperate with each other to engage the combine head to mount the head on the transport vehicle. Each of the support assemblies has a beam providing a support structure for the back stop and the arm. The backstop is adjustably mounted on the beam so that the back stop can be selectively located along the length of the beam. The arm extends upwardly from the beam and supports the longitudinal support memeber. The arm is adjustably mounted on the beam to provide for lateral and vertical adjustment of the support member. The adjustment of the arms of the support assemblies allows the operator to set the tilt on the combine head to a desired position. The adjustment of the back stop as well as the support member allows the bean or corn head of the combine to be set on the transport vehicle in accordance with the size of the head. The adjustments on the support assemblies permits the apparatus to carry different size and types of combine heads.

DESCRIPTION OF PREFERRED EMBODIMENT

Figure 1:
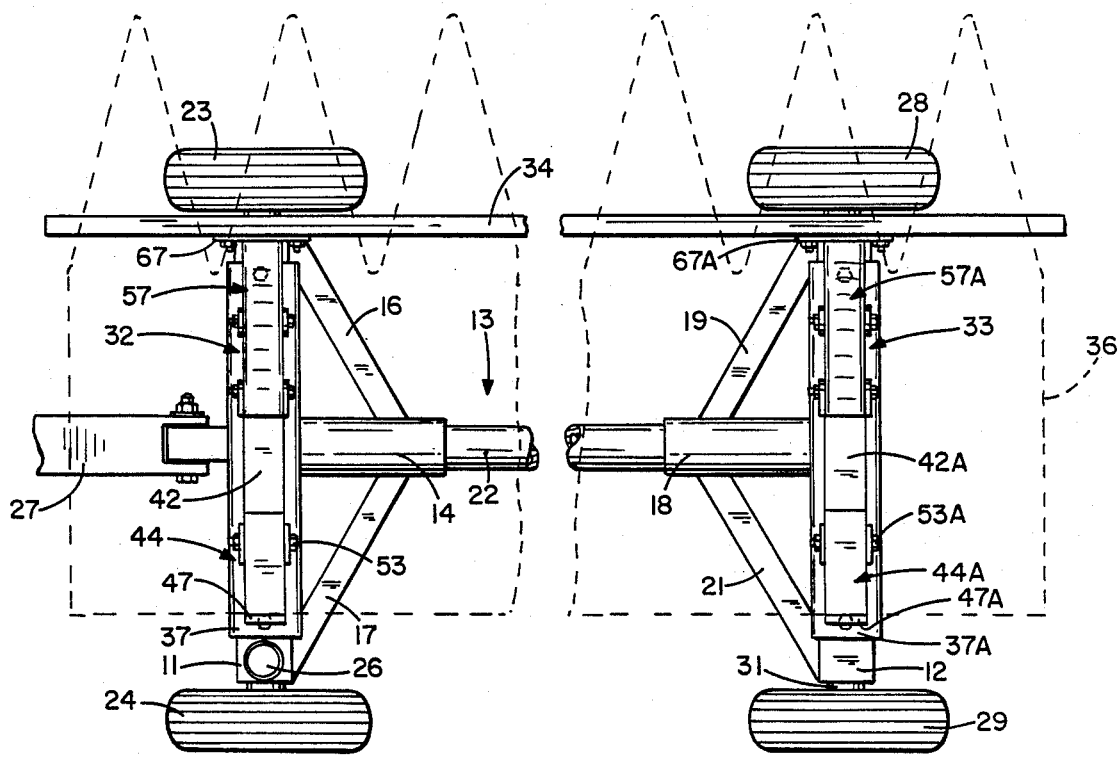
FIG. 1 is a foreshortened plan view of a wagon running gear equipped with the combine head carrier of the invention.

A vehicle 10, such as a wagon, truck, running gear and the like, is used to support a combine head 36 for transport to a new location. Vehicle 10 is shown in FIG. 1 as a wagon having transverse front and rear bolsters 11 and 12 connected together with a reach assembly 13. Reach assembly 13 includes a first sleeve 14 secured to the rear of bolster 11 and reinforced with a pair of braces 16 and 17 secured to opposite ends of bolster 11. A second sleeve 18 aligned with first sleeve 14 is secured to the front of bolster 12. Sleeve 18 is reinforced with a pair of braces 19 and 21 secured to opposite ends of bolster 12. A tube 22 extends into each of sleeves 14 and 18 providing a longitudinal adjustment of the length of the wagon. A pair of front wheels 23 and 24 are mounted on upright spindles 26 secured to opposite ends of front bolster 11. A forwardly directed tongue 27 is pivoted to the center of bolster 11 and connected to the spindle 26 with tie-rods (not shown) to facilitate the steering of front wheels 23 and 24. A pair of rear wheels 28 and 29 journaled on axles 31 are located at opposite ends of rear bolster 12. Axles 31 are secured to the lower portions of opposite ends of bolster 12. Other types of wagon structures and running gears can be used to carry the combine head 36.

The combine head 36 is positioned on a carrier mounted on vehicle 10 so that the length of the head is aligned with the longitudinal extent or length of the vehicle. Head 36 is released from the combine vehicle so that it can be separately moved or stored. This permits the vehicle to transport the head through gates and on roads to new fields and locations. The following description of the carrier is directed to a support apparatus for combine heads of different sizes, shapes and uses. It is understood that the carrier can be used to accommodate other objects, products, machines, and structures.

The combine head carrier as a pair of support assemblies indicated generally at 32 and 33 mounted on bolsters 11 and 12. An elongated longitudinal support member 34 is connected to support assemblies 32 and 33 to provide a longitudinal rest rail for combine head 36. Member 34 is an elongated linear member which may be a box beam, tube, angle iron and a wood or plastic beam.

Support assemblies 32 and 33 are identical in structure and operation. The front support assembly 32 carries one end of head 36 and the rear support assembly 33 carries the other end of the head 36. Head 36 is shown in broken lines as a row crop head for a self propelled combine. The head can be a small grain head for a combine. Support assemblies 32 and 33 can carry other objects, machines, products, and structures. The following description is limited to support assembly 32. The parts of support assembly 33 that are identical with the parts of support assembly 32 have the same reference numerals with the suffix A.

Figure 4:
FIG. 4 is an enlarged sectional view taken along the line 4—4 of FIG. 2.
Figure 4:
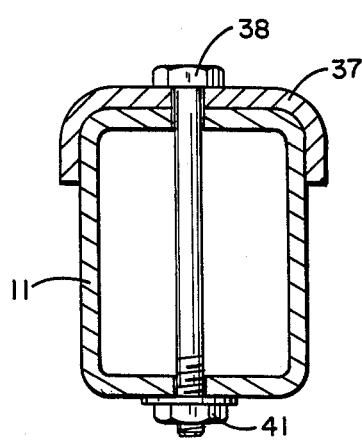

Support assembly 32 has a base 37 mounted on top of bolster 11. Base 37 is an inverted metal channel having a top wall located on top of bolster 11 and downwardly directed side flanges located adjacent opposite sides of the bolster. The flanges of base 37 are located in surface engagement with the opposite sides of bolster 11 to prevent twisting and movement of base 37 on bolster 11. A pair of bolts 38 and 39 secure opposite ends of base 37 to bolster 11. As shown in FIG. 4, bolster 11 is a box beam. Bolt 38 extends through aligned holes in the top of base 37 and in the top and bottom of bolster 11. A nut 41 threaded onto bolt 38 holds bolt 38 in assembled relation with bolster 11 and base 37.

Figure 2:
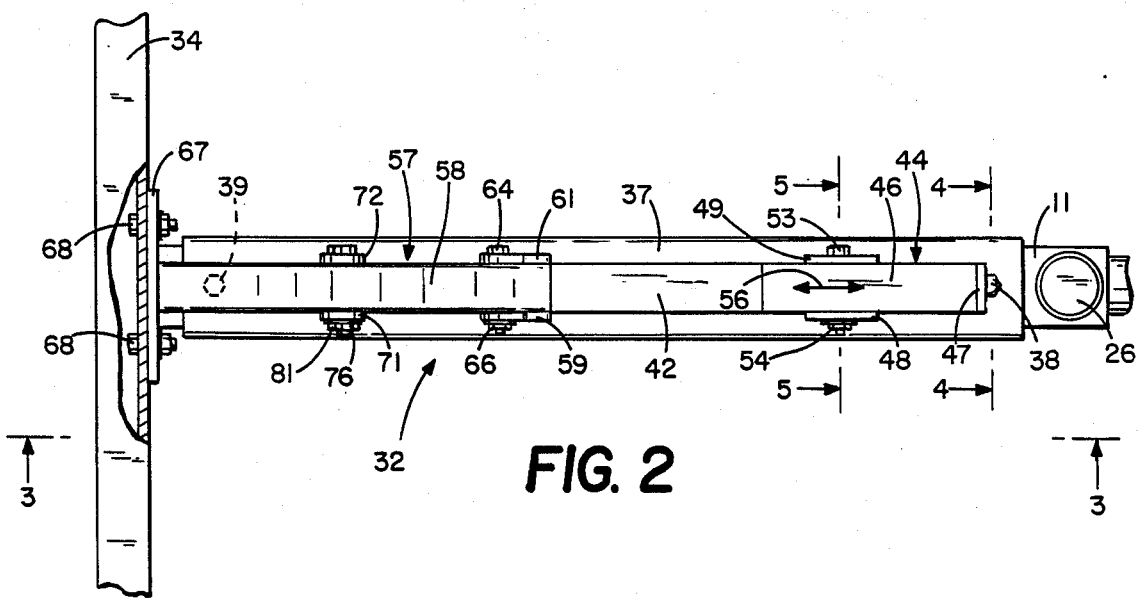
FIG. 2 is a top plan view of a support assembly and a portion of the longitudinal support member of the carrier of FIG. 1.
Figure 3:
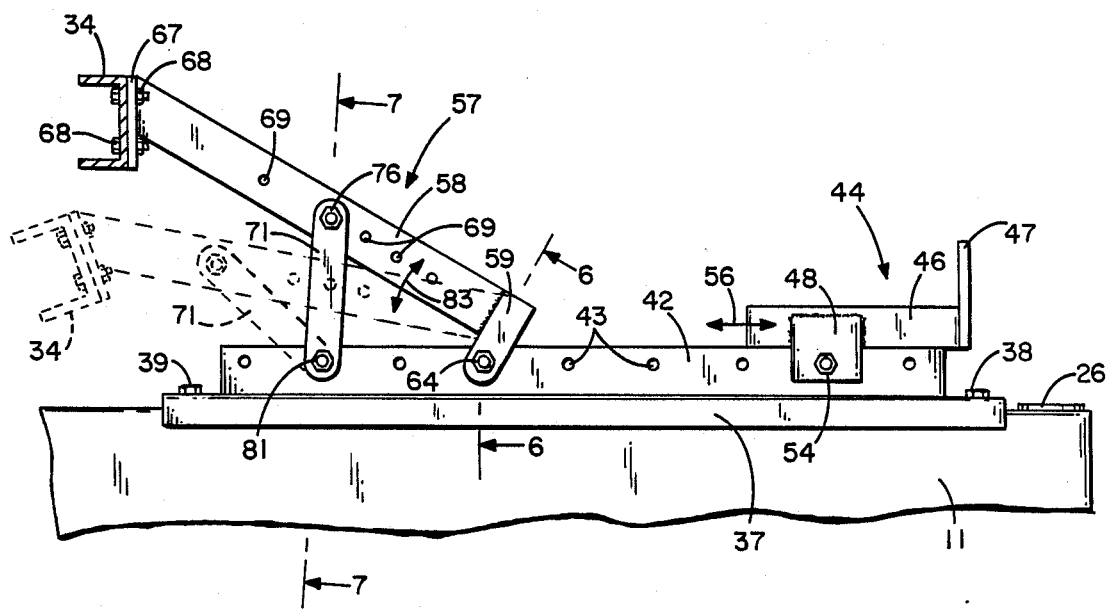
FIG. 3 is a sectional view taken along the line 3—3 of FIG. 2.

As seen in FIG. 3, a transverse support beam 42 is secured to the top of base 37. Beam 42 is a metal box member having a length substantially the same as the length of base 37. As shown in FIG. 2, the width of beam 42 is less than the width of base 37. For example, base 37 is a channel iron having a width of four inches. Beam 42 is a two-inch square box beam that is located along the mid-section of the top of base 37 and welded thereto. As shown in FIG. 3, beam 42 has a plurality of horizontal holes 43 laterally spaced from each other along the length of beam 42.

Figure 5:
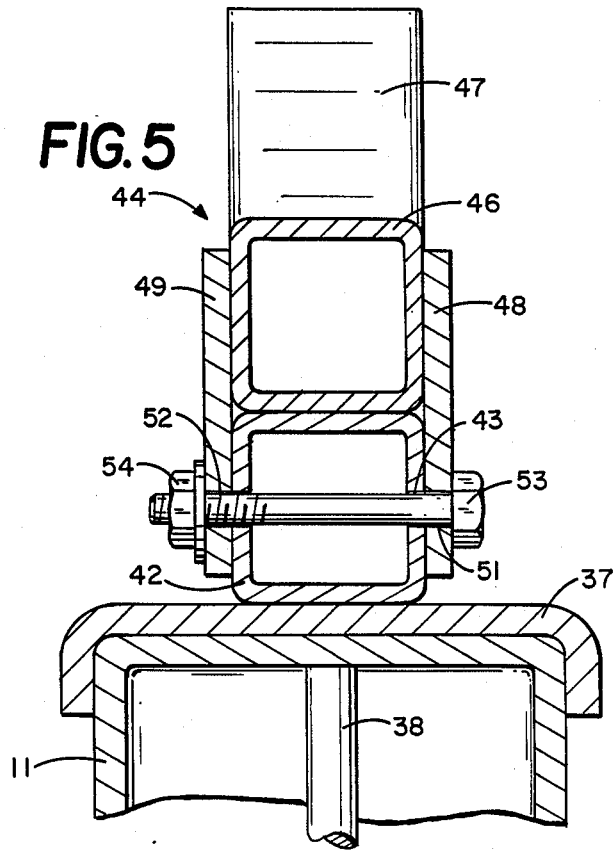
FIG. 5 is an enlarged sectional view taken along the line 5—5 of FIG. 2.

Referring to FIGS. 2, 3, and 5, a back stop, indicated generally at 44, is located on top of beam 42 adjacent one end thereof. Back stop 44 has a body 46 resting on top of beam 42. The outer end of body 46 is secured to an upright ear or tab 47 which functions as a stop to retain head 36 on support assembly 32. A pair of downwardly directed legs 48 and 49 are secured by welds or the like to opposite sides of body 46. As shown in FIG. 5, legs 48 and 49 have aligned holes 51 and 52 respectively for accommodating a bolt 53. Bolt 53 extends through a pair of holes 43 and beam 42. A nut 54 retains bolt 53 in assembled relation with the legs 48 and 49 and beam 42. Bolt 53 can be removed from back stop 44 and beam 42 to allow the back stop to be longitudinally adjusted along the length of beam 42 as indicated by the arrow 56 in FIGS. 2 and 3. Bolt 53 can be positioned in a selected hole 43 in beam 42 thereby adjusting the transverse position of back stop 44 relative to vehicle 10. Bolt 53 can be replaced with a removable hitchpin to facilitate the ease of adjustment of back stop 44 on beam 42.

Figures 6, 7:
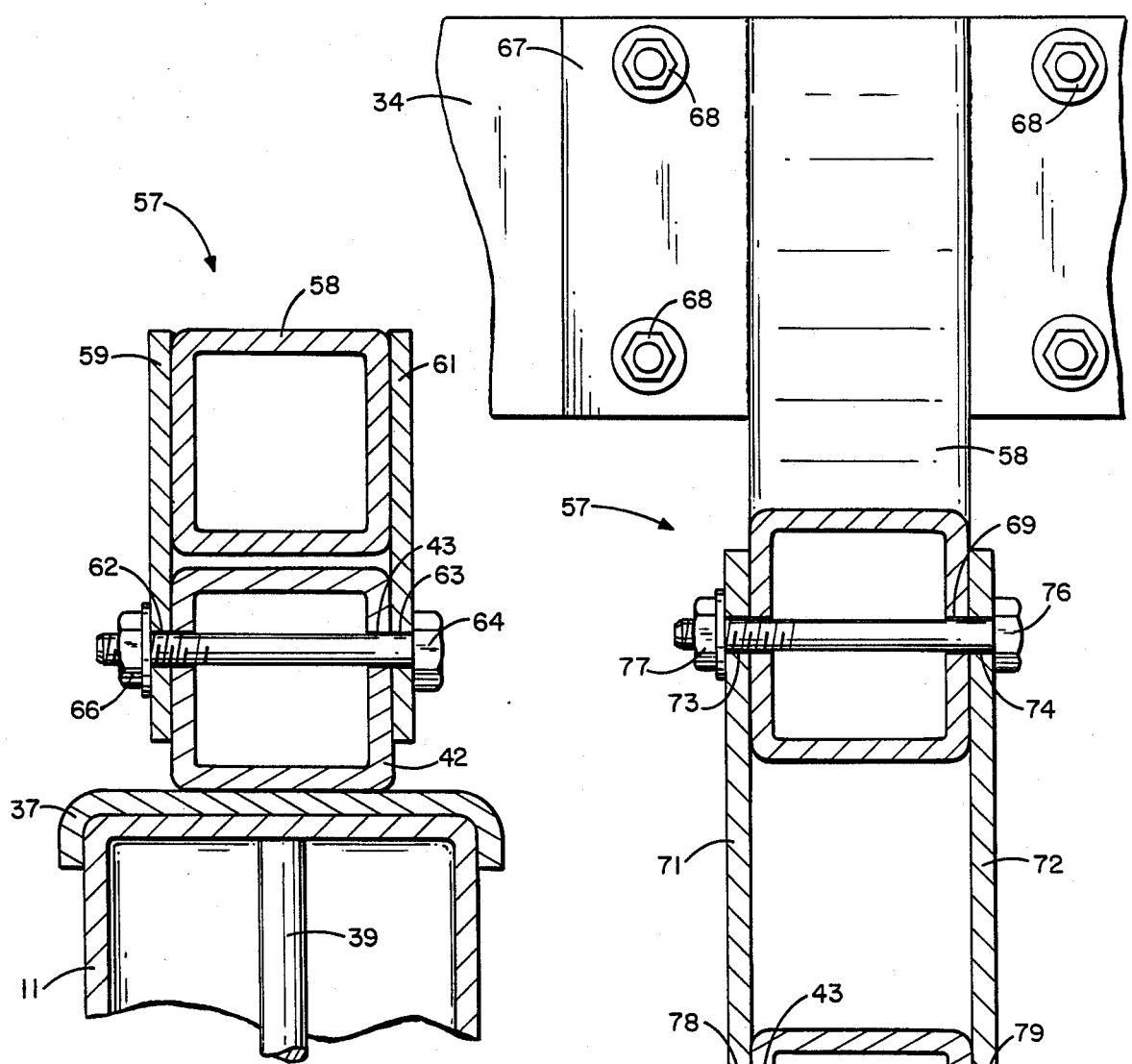
FIG. 6 is an enlarged sectional view taken along the line 6—6 of FIG. 3.
FIG. 7 is an enlarged sectional view taken along the line 7—7 of FIG. 3.

As shown in FIGS. 2, 3, and 7, longitudinal support member 34 is secured to an arm assembly indicated generally at 57 mounted on beam 42. Arm assembly 57 is vertically and transversely adjustable to accommodate different types of heads and vehicle structures. Arm assembly 57 has a linear arm 58 comprising a box beam. The lower end of arm 58 is secured to a pair of downwardly directly side members 59 and 61. Members 59 and 61 are plates welded to opposite sides of the lower end of arm 58. The lower ends of members 59 and 61 have aligned holes 62 and 63 respectively that accommodate a bolt 64. As seen in FIG. 6, bolt 64 projects through a pair of holes 43 in beam 42 thereby pivotally mount the arm 58 on beam 42. A nut 66, shown in FIG. 6, holds the bolt 64 in assembled relation with arm assembly 57.

Returning to FIGS. 2, 3, and 7, a plate 67 is secured by welds or the like to the upper end of arm 58. A plurality of nut and bolt assemblies 68 attached support member 34 to plate 67 so that the support 34 vertically and horizontally moves in response to the movement of arm 58. Arm 58 has a plurality of holes 69 along the length thereof. As seen in FIG. 3, holes 69 extend through the sides of arm 58. For example, arm 58 can be provided with five linearly spaced holes with the center hole being located in the center of arm 58.

A pair of rigid legs 71 and 72 hold arm 58 at a selected angular position relative to beam 42. Legs 71 and 72 have upper holes 73 and 74 respectively that accommodate a bolt 76. As seen in FIG. 7, bolt 76 extends through aligned holes 69 and arm 58 to pivotally connect the upper ends of the legs 71 and 72 to arm 58. A nut 77 threaded on bolt 76 maintains bolt 76 in assembled pivoting relation relative to arm 58 and legs 71 and 72. The lower ends of legs 71 and 72 are provided with holes 78 and 79 to accommodate a pivot bolt 81. Bolt 81 extends through aligned holes 43 in beam 42 and is retained on beam 42 with a nut 82.

Referring to FIG. 3, legs 71 and 72 can be selectively positioned in the holes 43 thereby change the angle of arm 58 as indicated by arrow 83. A lower position of arm 58 is shown in broken lines. Arm assembly 57 can be laterally positioned relative to the vehicle by changing the positions of the bolts 64 and 81 on the beam 42 to thereby change the location of the head relative to the transport vehicle.

In use, a pair of support assemblies 32 and 33 are mounted on bolsters 11 and 12 of vehicle 10. Bolts 38 and 39 are used to secure bases 37 and 37A to bolsters 11 and 12. The arm assemblies 57 and 57A on each of the support assemblies are then adjusted according to the requirements of the object to be transported, such as head 36. The first pivot bolt 64 pivotally mounts the lower end of the arm to beam 42. The legs 71 and 72 are then connected to the base 42 remote from pivot bolt 64 for arm 57 and thereby support the arm at a selected angle. The arm 57 being attached to the longitudinal support member 34 fixes the lateral as well as the vertical position of member 34. Arm 57A of the support assembly 33 is adjusted in a similar manner so that support member 34 is held in a generally horizontal position along one side of vehicle 10 as shown in FIG. 1.

Back stop 44 is then mounted on beam 42. Stop 44 is initially positioned in a selected position along the length of beam 42. Bolt 53, as shown in FIG. 5, secures back stop 44 in a selected position on beam 42. Back stop 44A is then mounted on beam 42A. The upright ears 47 and 47A are located on the side of vehicle 10 opposite the longitudinal member 37.

Head 36 is loaded on vehicle 10 with the combine vehicle. The combine vehicle with head 36 is moved adjacent the side of vehicle 10 having back stops 44 and 44A. Head 36 is raised and combine vehicle is moved forward to locate head 36 over vehicle 10. Head 36 is then lowered unto support member 34 and back stops 44 and 44A.

Ears 47 and 47A extended in an upward direction engage the back side of head 36 to prevent the lateral movement of head 36 on vehicle 10. For transport of head 36 on vehicle 10 over the road, additional holding structures, such as chains, cables, or the like are used to secure head 36 to bolsters 11 and 12 or other parts of the vehicle.

While there is shown and described a preferred embodiment of the support assemblies and their use with a combine head, it is understood that changes in the structures, materials, arrangements of structure and use of the support assemblies may be made by those skilled in the art without departing from the invention. The invention is defined in the following claims.

The embodiments of the invention in which an exclusive property or privilege is claimed are defined as follows:

1. An apparatus for supporting an object on a support comprising:
   a first support assembly mountable on the support,
   a second support assembly mountable on the support remote from the first support assembly, a support member extended between and secured to said first and second support assemblies, each of said support assemblies having a beam and back stop means spaced from the support member, means connecting the back stop means to the beam, said beam and means connecting the back stop means to the beam including cooperating means for adjusting the position of the back stop means along the length of the beam, arm means located remote from the back stop means, means connecting the arm means to the beam, and means connecting the support member to said arm means, said support member and back stop means operable to hold the object on the support member and first and second support assemblies.

2. The apparatus of claim 1 wherein: said cooperating means includes holes in the beam and pin means extended through said holes to mount the back stop means on the beam.

3. The apparatus of claim 1 wherein: each of said support assemblies has a base adapted to be secured to a support, said base having a top wall.

4. The apparatus of claim 3 wherein: said base is an elongated inverted U-shaped member.

5. The apparatus of claim 3 wherein: each support assembly has a beam secured to the top wall of the base and extended the length thereof, said beam having side walls having a plurality of holes along the length thereof, said means connecting the back stop means to the beam including pin means extended through one of said holes to mount the back stop means in a selected position on said beam.

6. The apparatus of claim 5 including: said means connecting the arm means to the beam includes pivot means extended through another of said holes to pivotally mount the arm means on the beam, and leg means connected to the beam and arm means to hold the arm means in a selected position relative to the beam.

7. An apparatus for supporting an object on a support comprising: a first support assembly mountable on the support, a second support assembly mountable on the support remote from the first remote support assembly, a support member extended between and secured to said first and second support assemblies, each of said support assemblies having a beam and back stop means spaced from the support member, said beam having a top wall and side walls, said back stop means includes a body supported on the top wall of the beam, leg means secured to the body and extended adjacent the side walls of the beam, means connecting the back stop means to the beam, said means connecting the back stop means to the beam including means cooperating with the leg means and side walls of the beam for adjusting the position of the back stop means along the length of the beam, arm means located remote from the back stop means, means connecting the arm means to the beam, and means connecting the support member to said arm means, said support member and back stop means operable to hold the object on the support and first and second support assemblies.

8. The apparatus of claim 7 wherein: the side walls of the beam have a plurality of first holes along the length thereof, said leg means having second holes adapted to align with any one of the first holes in the side walls of the beam, and pin means extended through aligned first and second holes to secure the back stop means to the beam.

9. An apparatus for supporting an object on a support comprising: a first support assembly mountable on the support, a second support assembly mountable on the support remote from the first support assembly, a support member extended between and secured to said first and second support assemblies, each of said support assemblies having a beam and back stop means spaced from the support member, means connecting the back stop means to the beam, arm means located remote from the back stop means, means connecting the arm means to the beam including pivot means pivotally connecting the arm means to the beam, leg means connected to the beam and arm means to hold the arm in a selected position relative to the beam, end means connecting the support member to said arm means, said support member and back stop means operable to hold the object on the support member and first and second support assemblies.

10. An apparatus for mounting a combine head on a transport vehicle having transverse bolsters comprising: a first support assembly mountable on one bolster and extended along the length thereof, a second support assembly mountable on another bolster and extended along the length thereof, a support member extended between the first and second support assemblies, each of said support assemblies having arm means and back stop means spaced from the arm means, means connecting the arm means to the support member, said support member and back stop means being engageable with the combine head to mount the head on the support member and first and second support assemblies.

11. The apparatus of claim 10 wherein: each support assembly has an inverted U-shaped base mountable on top of a bolster of the transport vehicle.

12. The apparatus of claim 10 wherein: each of said support assemblies has an elongated beam locatable generally parallel to a bolster, means connecting the back stop means to the beam, said arm means located remote from the back stop means, and means connecting the arm means to the beam, said support member being connected to said arm means.

13. The apparatus of claim 12 wherein: each beam and means connecting the back stop means to the beam includes cooperating means for adjusting the position of the back stop means along the length of the beam.

14. The apparatus of claim 13 wherein: said cooperating means includes holes in the beam and pin means extended through said holes to mount the back stop means on the beam in a selected position.

15. The apparatus of claim 12 wherein: each beam has a top wall and side walls, said back stop means includes a body supported on a top wall of the beam, leg means secured to the body and extended adjacent the side walls of the beam, said means connecting the back stop means to the beam including means cooperating with the leg means and side walls of the beams for adjusting a position of the back stop means along the length of the beam.

16. The apparatus of claim 15 wherein: the side walls of the beam have a plurality of first holes along the length thereof, said leg means having second holes adapted to align with any one of the first holes in the side walls of the beam, and pin means extended through the first and second holes to secure the back stop means to the beam.

17. The apparatus of claim 12 wherein: the means connecting the arm means to the beam includes pivot means pivotally connecting the arm means to the beam, and leg means connected to the beam and arm means to hold the arm in a selected position relative to the beam thereby adjusting the position of the support member to accommodate the head.

18. A support assembly for use in holding an object on a support comprising: a beam mountable on a support, a back stop mounted on the beam, means connecting the back stop to the beam, said beam and means connecting the back stop to the beam includes cooperating means for adjusting the position of the back stop along the length of the beam, arm means located above the beam remote from the back stop, means connecting the arm means to the beam, leg means connected to the beam and arm means to hold the arm means in a selected position relative to the beam, and a support member secured to said arm means whereby said object is retained on the back stop and support member.

19. The support assembly of claim 18 wherein: said cooperating means includes holes in the beam, and pin means extended through said holes to mount the back stop on the beam.

20. The support assembly of claim 18 wherein: the beam has a top wall and side walls, said back stop includes a body supported on the top wall of the beam, second leg means secured to the body and extended adjacent the side walls of the beam, said means connecting the back stop to the beam including means cooperating with the second leg means and side walls of the beam for adjusting the position of the back stop along the length of the beam.

21. The support assembly of claim 20 wherein: the side walls of the beam have a plurality of first holes along the length thereof, said second leg means having second holes adapted to align with any one of the first holes in the side walls of the beam, and pin means extended through aligned first and second holes to secure the back stop to the beam.

22. The support assembly of claim 18 wherein: said back stop has upwardly directed ear means adapted to engage the object and retain the object on the back stop means.

23. The support assembly of claim 18 wherein: the means connecting the arm means to the beam includes pivot means pivotally connecting the arm means to the beam.

24. The support assembly of claim 18 including: a base adapted to be secured to a support, said base having a top wall.

25. The support assembly of claim 24 wherein: said base is an elongated inverted U-shaped member.

26. The support assembly of claim 24 wherein: the beam is secured to the top of wall of the base and extends the length thereof, said beam having side walls having a plurality of holes along the length thereof, said means connecting the back stop to the beam including pin means extended through one of said holes to mounted on the back stop in a selected position on said beam.

27. The support assembly of claim 26 wherein: the means connecting the arm means to the beam includes a pivot pin extended through another of said holes to pivotally mount the arm means on the beam.

* * * * *